Aug. 9, 1932.  F. L. McCARTY  1,870,291
LOADING ATTACHMENT FOR CONVEYER MECHANISM
Original Filed June 22, 1926  2 Sheets-Sheet 1
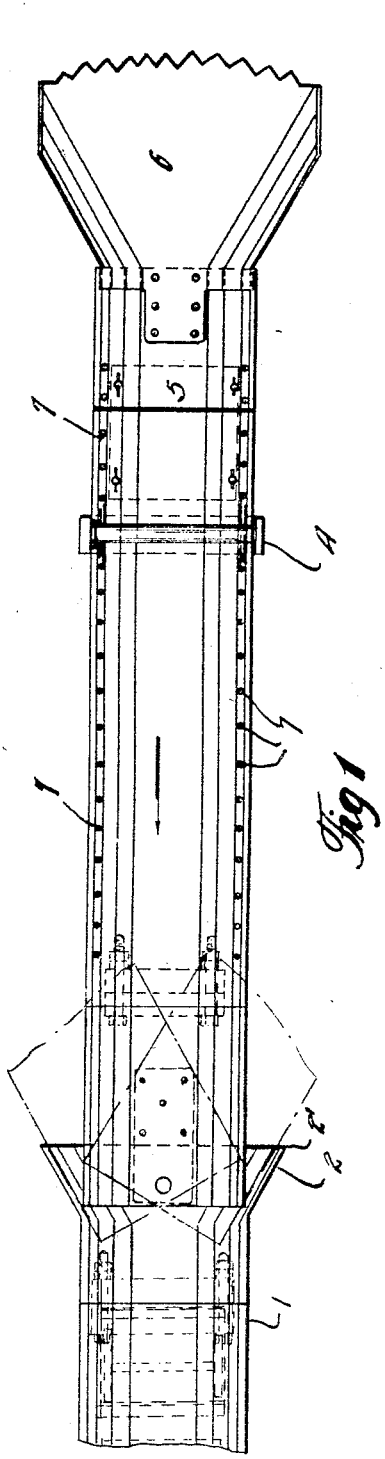
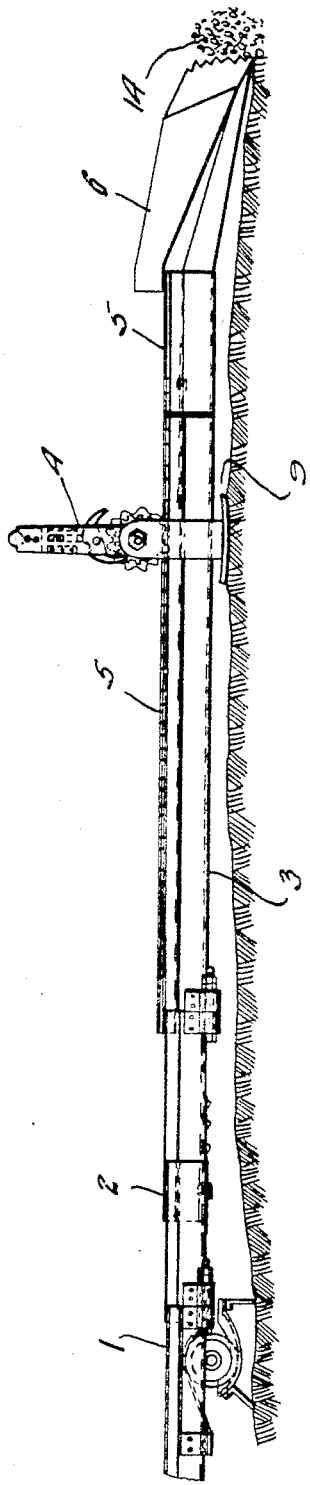
INVENTOR
*Frank L. McCarty*
BY
*Semmes + Semmes*
ATTORNEYS INVENTOR
Frank L. McCarty
BY
Semmes & Semmes
ATTORNEYS Patented Aug. 9, 1932

1,870,291

UNITED STATES PATENT OFFICE

FRANK L. McCARTY, OF ROCK SPRINGS, WYOMING, ASSIGNOR, BY MESNE ASSIGNMENTS, TO GOODMAN MANUFACTURING COMPANY, OF CHICAGO, ILLINOIS, A CORPORATION OF ILLINOIS

LOADING ATTACHMENT FOR CONVEYER MECHANISM

Application filed June 22, 1926, Serial No. 117,832. Renewed January 7, 1932.

This invention relates to improvements in loading attachments designed to operate in conjunction with reciprocating conveyers, and more particularly has reference to improvements of the extending mechanism as disclosed in application Serial No. 117,826, filed of even date.

Previous to this time, in loading attachments of this character the maximum capacity of the machine has not been developed, and it has further been found desirable that the extension or retraction of the loader be made with greater rapidity than was heretofore possible or when the conveyer was not in operation.

An object of this invention is to provide a loading attachment adapted to operate in conjunction with a reciprocating conveyer that will develop the maximum capacity of the machine.

Another object of this invention is to provide a loading attachment adapted to operate in conjunction with a reciprocating conveyer that may be extended or retracted with utmost rapidity.

A further object of this invention is to provide a loading attachment adapted to operate in conjunction with a reciprocating conveyer that may be extended or retracted when the conveyer is not in motion.

This invention consists in general of the provision of a loading attachment having a flanged swinging bottom trough and a flanged inner extensible trough having provided on the flanges a series of apertures.

Secured to the bottom swinging trough is an improved extension and retraction mechanism provided with a toothed wheel adapted to mesh in the apertures on the flanges of the inner trough. The toothed wheel has either integral therewith or firmly secured thereto a ratchet held in place by a reversible pawl positioned by a plunger. Operating simultaneously in conjunction with the toothed wheel is an eccentric clamp designed to also engage the flange of the inner trough.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a top plan view of the improved loading attachment shown coupled to the end of a reciprocating conveyer;

Fig. 2 is a side elevational view of the improved loading attachment shown coupled to the end of a reciprocating conveyer;

Figure 3:
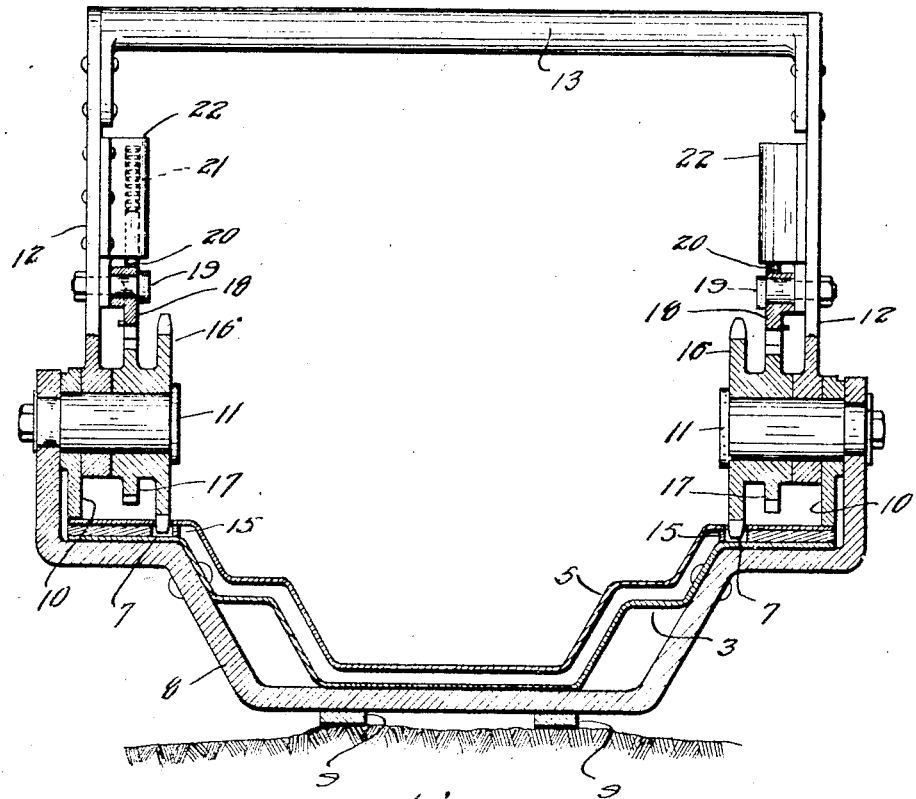
Fig. 3 is a front elevation sectional view of the improved feeding mechanism shown in engagement with the main body of the loading attachment.

Referring by numerals to the drawings, in Figs. 1 and 2 the rear end of the reciprocating conveyer is designated by the numeral 1 to which there is adapted to be secured, so as to reciprocate in conjunction therewith, a loading attachment comprising a fixed flared trough 2 joined to the conveyer by bolts positioned in ears. Joined to the fixed flared trough, by a hinge bolt allowing lateral movement, is the main body of the loading attachment comprising a flanged bottom swinging conveyer trough 3, and a flanged inner sectional extensible trough 5 having secured thereto a shoveling head 6 adapted to engage material to be conveyed. The flanges of the inner extensible trough are provided with a plurality of apertures 7.

Figure 4:
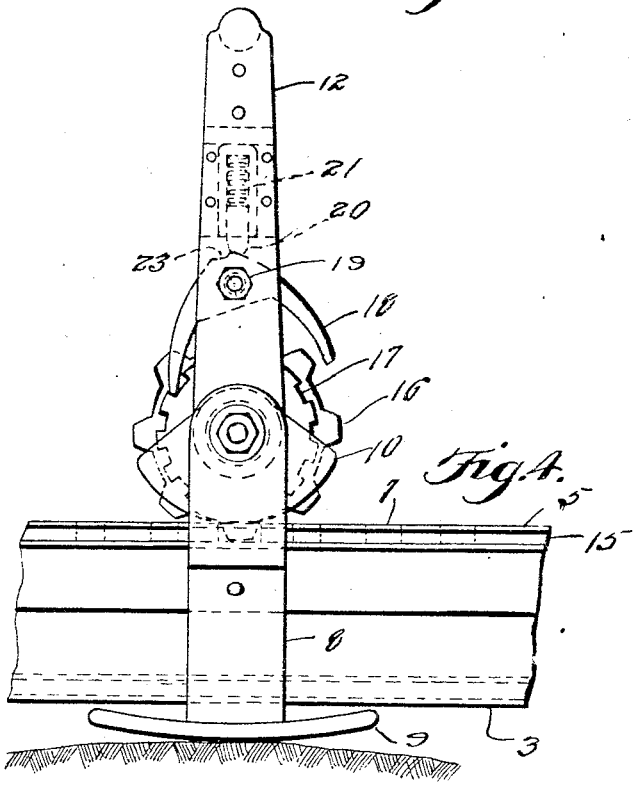
Fig. 4 is a side elevation plan view of the feeding mechanism.

The extending mechanism 4, better shown in Figs. 3 and 4, is adapted to be secured to the bottom trough 3 by any suitable means.

This improved feeding mechanism comprises a frame 8, riveted to the swinging bottom trough 3, having two supporting skids 9. Between the flanges of the bottom trough 3 and the inner trough 5 is a reinforcement strip 14 provided with apertures 15 adapted to coincide with the apertures 7 of the flanges of the inner trough 5. Mounted on the frame 8 are adjustable eccentric clamps 10 held by fulcrum pins 11 allowing rotation. To the clamps are secured levers 12 having a unitary handle 13.

Mounted on the fulcrum pins 11 together with the clamps 10 is a toothed wheel 16 operating in conjunction with a ratchet wheel 17. It is preferable that the ratchet and the toothed wheel be cast as an integral member, although it is manifest that they may be two separate elements suitably secured together. A reversible pawl 18 hinging on a pin 19 secured to the lever 12 is adapted to engage the ratchet wheel 17. The pawl is held against the ratchet wheel in either position by a plunger 20 actuated by a spring 21 operating in a barrel 22 mounted on the lever 12. A notch 23 is provided on the apex of the reversible pawl 18.

The operation of this improved loading attachment may be readily understood, having reference to Figs. 2 and 4. The reciprocating conveyer 1 when in operation will reciprocate the entire loading attachment, extending and retracting the shoveling head 6. The shoveling head will be fed further and further into the material to be loaded by the extension of the trough 5 to which it is secured.

When the conveyer is operating normally, the pawl 18 will be thrown in neutral; that is, the plunger 20 will engage the notch 23 and the lever 12 is fixed in either a forward or backward position and thus the clamps 10 are tightened and the troughs 3 and 5 held together so that the trough 3 having the shoveling head 6 fixed to the end, is reciprocated with the conveyer. If it is desired to advance the shoveling head the handle 13 is brought to an upright position during the reversed stroke of the conveyer 1, thereby releasing the clamp pressure and permitting the trough 3 to slide from under the trough 5. Before the conveyer again moves toward the material, the clamps 10 are tightened by forward or backward pressure on the handle 13 and the shoveling head 6 is fixed on the bottom thereof. By reversing this action, the shoveling head may be retracted during the operation of the conveyer. In the event of the conveyer operating too slowly, or when idle, the shoveling head 6 may be extended or retracted by the ratchet pawl and toothed gear mechanism, constituting the body of this improvement.

The toothed gear 16 is in continuous engagement with the apertures 7 on the flange of the inner trough 5 and the apertures 15 on the reinforcement strip 14. The reversible pawl being in neutral position, when it is desired to extend or retract the mechanism, the right or left hand pawls are placed in engagement with the ratchet wheels according to whether it is desired to extend or retract the shoveling head. If the pawls are positioned as shown in Figure 2, the trough 5 may be extended by pulling the handle backward and thus jacking the trough 5 forward by engagement of the sprocket wheels with the racks on the flanges, or if it is desired to retract the trough, the pawls are fixed in reverse position and the handle pushed forward.

There is accomplished by this invention an improved loading attachment adapted to afford the maximum capacity of carriage, and that may be extended or retracted with greater facility and rapidity than has heretofore been possible. There is further attained a loading mechanism for a reciprocating conveyer that may be extended or retracted when the conveyer is idle or out of order, as well as when it is in motion.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

I claim:
1. A loading attachment for a reciprocating conveyer comprising a movable trough, a bottom trough and means mounted on the bottom trough to extend or retract the movable trough when not in motion.

2. A loading attachment for a reciprocating conveyer comprising an extensible trough and means to extend or retract the trough comprising a pawl and ratchet mechanism.

3. A loading attachment for a reciprocating conveyer comprising an extensible trough and means to extend or retract the trough comprising a toothed wheel operated by a pawl and ratchet mechanism.

4. A loading attachment for a reciprocating conveyer comprising an extending and retracting mechanism, a bottom trough and a movable trough, and means mounted on the bottom trough to fix the extending and retracting mechanism in engagement with the movable trough.

5. A loading attachment for a reciprocating conveyer comprising a bottom trough, an extending and retracting mechanism mounted on the bottom trough, a movable trough having flanges, and means on the flanges to engage the mechanism mounted on the bottom trough.

6. A loading attachment for a reciprocating conveyer comprising a bottom trough, an extending and retracting mechanism mounted on the bottom trough and a movable flanged trough provided with apertures adapted to be engaged by the mechanism.

7. In a loading attachment comprising a bottom trough an extending and retracting mechanism mounted on the bottom trough and a movable flanged trough, the combination of a toothed wheel mounted on said mechanism and apertures in the flanges of the trough adapted to be engaged by the toothed wheel.

8. In an extending and retracting reciprocating conveyer loading mechanism embodying a bottom trough, a movable trough, a plurality of sprocket wheels mounted on the bottom trough and adapted to engage the movable trough, the combination of a reversible pawl to fix the position of the sprocket wheels and a plunger adapted to fix the position of the reversible pawl.

9. In an extending and retracting reciprocating conveyer loading mechanism embodying a bottom trough and a flanged movable trough, the combination of a toothed wheel adapted to engage the flanges of the movable trough and a ratchet adapted to operate the wheel.

10. In an extending and retracting reciprocating conveyer loading mechanism embodying a bottom trough and a flanged movable trough, the combination of a toothed wheel adapted to mesh with the flanges of the movable trough a ratchet adapted to operate the toothed wheel, a reversible pawl adapted to engage the ratchet and a positioning plunger adapted to fix the position of the pawl.

11. In an extending and retracting reciprocating conveyer loading mechanism embodying a bottom trough and a movable trough, the combination of an eccentric clamp and a toothed wheel adapted to engage the movable trough.

12. In combination with a reciprocating conveyer, a loading attachment comprising a trough and an extending and retracting mechanism having mounted thereon means to extend or retract the trough when the conveyer is idle.

13. In combination with a reciprocating conveyer, a loading attachment comprising a flanged trough provided with apertures on the flanges and an extending and retracting mechanism having mounted thereon a toothed wheel adapted to engage the apertures on the flanges of the trough.

14. In combination with a reciprocating conveyer, a loading attachment comprising a flanged trough provided with apertures on the flanges, and an extending and retracting mechanism having mounted thereon a toothed wheel cooperating with a ratchet and reversible pawl positioned by a plunger, adapted to engage the apertures on the flanges of the trough.

15. In combination with a reciprocating conveyer, a loading attachment comprising a flanged trough provided with apertures on the flanges, and an extending and retracting mechanism having mounted thereon a toothed wheel cooperating with a ratchet and reversible pawl positioned by a plunger and operating in conjunction with an eccentric clamp, adapted to engage the apertures on the flange of the trough.

16. A reciprocating conveyer comprising a loading attachment having an extensible trough nested therein, but disconnected therewith movable laterally and longitudinally with respect to the conveyer when the conveyer is idle.

17. A method of extending or retracting a reciprocating conveyer comprising nesting one trough within another trough in disconnected relation and jacking the nested trough with respect to the trough within which it is nested.

18. The combination with a reciprocatory conveyer of a longitudinally extensible feeder therefor, comprising a trough in communication with the end of the conveyer and adapted to reciprocate in unison therewith, and a second trough longitudinally movable in relation to the first trough, means for imparting a longitudinal movement to said second trough, and means for holding it against such movement.

19. The combination with a reciprocatory conveyer, of a longitudinally extensible feeder therefor, comprising a trough in communication with the end of the conveyer and adapted to reciprocate in unison therewith, and a second trough longitudinally movable in relation to the first trough, means for imparting a longitudinal movement to said second trough in relation to said first trough and locking means adapted normally to hold it against such movement.

20. The combination with a reciprocatory conveyer, of a longitudinally extensible feeder therefor, comprising a trough in communication with the end of the conveyer and adapted to reciprocate in unison therewith, and a second trough longitudinally movable in relation to the first trough, means for imparting a longitudinal movement to said second trough in relation to said first trough and locking means adapted normally to hold it against such movement, comprising an eccentric clamp.

21. The combination with a reciprocatory conveyer, of a longitudinally extensible feeder therefor, comprising a trough in communication with the end of the conveyer and adapted to reciprocate in unison therewith, and a second trough longitudinally movable in relation to the first trough, and means for imparting a longitudinal movement to said second trough, including a rack on one of said troughs and a rack engaging member on the other, and means for actuating it.

22. The combination with a reciprocatory conveyer, of a longitudinally extensible feeder therefor, comprising a trough in communication with the end of the conveyer and adapted to reciprocate in unison therewith, and a second trough longitudinally movable in relation to the first trough, means for imparting a longitudinal movement to said second trough, including a rack on one of said troughs and a rack engaging ratchet wheel on the other, and means for actuating it.

23. The combination with a reciprocatory conveyer, of a longitudinally extensible feeder therefor, comprising a trough in communication with the end of the conveyer and adapted to reciprocate in unison therewith, and a second trough longitudinally movable in relation to the first trough, means for imparting a longitudinal movement to said second trough, including a rack on one of said troughs and a rack engaging ratchet wheel on the other, and means for actuating it, comprising a lever and a dog on said lever.

24. A loading attachment for a reciprocating conveyer comprising a trough nested in, but disconnected from the end trough of a conveyer, and movable with respect thereto when the conveyer is idle or in motion.

In testimony whereof I affix my signature.

FRANK L. McCARTY.